United States Patent
Matsunaga et al.

(10) Patent No.: US 8,452,711 B2
(45) Date of Patent: May 28, 2013

(54) SYSTEM AND METHOD TO PREVENT UNAUTHORIZED COPYING OF A DOCUMENT

(75) Inventors: Sabrina Pui-Wah Matsunaga, Oak Park, CA (US); Francisco M. Valeriano, Torrance, CA (US); Amos Y. Kuo, Torrance, CA (US)

(73) Assignee: Xerox Corporation, Norwalk, CT (US)

( * ) Notice: Subject to any disclaimer, the term of this patent is extended or adjusted under 35 U.S.C. 154(b) by 2056 days.

(21) Appl. No.: 11/406,162

(22) Filed: Apr. 18, 2006

(65) Prior Publication Data

US 2007/0244821 A1    Oct. 18, 2007

(51) Int. Cl.
*G06F 21/00* (2006.01)
*G06F 7/04* (2006.01)

(52) U.S. Cl.
USPC ........ 705/57; 726/1; 726/26; 726/27; 726/28; 726/30; 726/31; 726/32; 726/33

(58) Field of Classification Search
USPC ................. 705/50–79; 726/1, 26–33
See application file for complete search history.

(56) References Cited

U.S. PATENT DOCUMENTS

| 4,728,984 | A | | 3/1988 | Daniele | 355/6 |
| 5,068,888 | A | * | 11/1991 | Scherk et al. | 379/100.11 |
| 5,982,956 | A | | 11/1999 | Lahmi | 382/306 |
| 6,175,714 | B1 | | 1/2001 | Crean | 399/366 |
| 2004/0100363 | A1 | * | 5/2004 | Lane et al. | 340/5.86 |
| 2005/0171914 | A1 | * | 8/2005 | Saitoh | 705/51 |
| 2006/0218643 | A1 | * | 9/2006 | DeYoung | 726/26 |
| 2009/0083831 | A1 | * | 3/2009 | Kanai | 726/1 |

* cited by examiner

*Primary Examiner* — Tsan-Yu J Huang
(74) *Attorney, Agent, or Firm* — Alix, Yale & Ristas, LLP

(57) ABSTRACT

Apparatus preventing unauthorized copying of a document includes a secure document reproducing system having a document input device to receive and reproduce the secure document. A reader device detects an electronic data storage device affixed to the document and reads authorization information stored therein. A user wishing to copy the secure document inputs authorization information into a user interface module. The authorization information from the user is compared to the authorization information retrieved from the electronic data storage device, and if the two are identical, the secure document is reproduced.

21 Claims, 5 Drawing Sheets

SYSTEM AND METHOD TO PREVENT UNAUTHORIZED COPYING OF A DOCUMENT

BACKGROUND

This disclosure relates generally to documents containing information to which access is to be restricted. More particularly, the present disclosure relates to a system and method for controlling reproduction and dissemination of secure documents.

Individuals are often comfortable dealing with documents in hard-copy format. However, control of document reproduction and dissemination is a concern because copies of documents containing sensitive information can be easily transmitted from person to person. As such, there is a risk of documents containing sensitive information being reproduced innocently or illicitly by persons without authorization.

Various technologies have been developed to limit the unauthorized copying of sensitive information contained in a document by replacing the sensitive information with machine readable code. U.S. Pat. No. 4,728,984 discloses a bar-coded document that enables the document or document copies to be mailed or exchanged without revealing the documents content to non-authorized persons. Bar code storage density is low and once access to the document is granted, the document is revealed in its entirety. U.S. Pat. No. 5,982,956 discloses sensitive documents that include rules which define duplication restrictions. Once a request for duplication is received the rules are read and a decision is made to allow or disallow the entire contents of the document to be reproduced. U.S. Pat. No. 6,175,714, describes the use of glyphs that encode a security code for access to a reproduced document. The glyphs are placed in the background of the entire document and are visually obtrusive. Once access to the document is granted, the entire document is reproduced.

In summary, prior attempts to control reproduction of documents containing sensitive information offer access that is all or nothing. Once access is granted, it cannot be controlled in any other way which makes it difficult to control who should have access to the information contained within the document. Thus, there is a need in the art for an improved system and/or method for securing documents.

SUMMARY

There is provided an apparatus preventing unauthorized copying of a secure document, the secure document including an electronic data storage device having authorization information stored therein, the apparatus comprising a secure document reproducing system. The secure document reproducing system includes a document input device to receive and reproduce the secure document, a reader device to detect the electronic data storage device and read the authorization information stored in the electronic data storage device, and a user interface module to gather authorization information from a user wishing to copy the secure document. The secure document reproducing system compares the authorization information from the user to the authorization information retrieved from the electronic data storage device of the secure document and reproduces the secure document if the authorization information from the user is identical to the authorization information retrieved from the electronic data storage device of the secure document.

The document input device includes at least one of a copier, a xerographic system, an electrostatographic machine, a digital image scanner, a disk reader, a hard disk or other digital storage media, a network or other communication capability to receive a document or related information, or a multi-functional device. The multi-functional device includes an apparatus comprising a facsimile function, a printer function, a copy function, and a scanner function, or a plurality of interconnected devices, each including at least one of a facsimile function, a printer function, a copy function, and a scanner function.

The user interface module includes at least one of apparatus to input a name, apparatus to input a password, apparatus to input a pin, apparatus to input a X 509 certificate, apparatus to input an access card, apparatus to input a group belongings, apparatus to input a time, apparatus to input a date, apparatus to input a location, apparatus to input a decryption key, apparatus to input a biometric technology identifier, or apparatus to input other identifiers.

The apparatus also comprises a secure document creating system includes a document producing device to produce a secure document having an electronic data storage device affixed thereto, an input device to receive or create the electronic authorization information; and a computer loader device to store the electronic authorization information in the electronic data storage device.

The document producing device includes at least one of a copier, a xerographic system, an electrostatographic machine, a digital image scanner, a disk reader, a hard disk or other digital storage media, a network or other communication capability to receive a document or related information, or a multi-functional device. The multi-functional device includes an apparatus comprising a facsimile function, a printer function, a copy function, and a scanner function, or a plurality of interconnected devices, each including at least one of a facsimile function, a printer function, a copy function, and a scanner function.

There is also provided a method of preventing unauthorized copying of a secure document, the secure document including an electronic data storage device having authorization information stored therein, the method comprising reading the authorization information stored in the electronic data storage device affixed to the document at a secure document reproducing system, requiring the user to input authorization information, comparing the authorization information input by the user to the authorization information stored in the electronic data storage device of the secure document, and reproducing the secure document if the authorization information input by the user is identical to the authorization information stored in the electronic data storage device of the secure document.

Reproducing an authorized copy of the secure document also includes initiating a search for an electronic data storage device with a computer reader device of the secure document reproducing system, reading the electronic data storage device with the computer reader device if an electronic data storage device is detected, and determining whether the electronic data storage device contains valid authorization information. If no electronic data storage device is detected or if the electronic data storage device does not contain valid authorization information, the document is reproduced.

If valid authorization information is detected, the user is prompted to input the authorization information. Prompting the user to input the authorization information also includes incrementing a user query counter by one, initiating a query response timer, determining whether the authorization information has been received when the query response timer times-out, and comparing the authorization information inputted by the user to the authorization information stored in the electronic data storage device if the authorization information has been received If the authorization information inputted by the user is not identical to the authorization information stored in the electronic data storage device, it is determined whether the user query count exceeds a count limit. If the user query count exceeds the count limit, reproduction of the secure document is prevented. If the user query count does not exceed the count limit, the user is required to re-input the authorization information.

If the authorization information has not been received, it is determined whether the user query count exceeds a count limit. If the user query count exceeds the count limit, reproduction of the secure document is prevented. If the user query count does not exceed the count limit, the user is required to re-input the authorization information.

BRIEF DESCRIPTION OF THE DRAWINGS

The present disclosure may be better understood and its numerous objects and advantages will become apparent to those skilled in the art by reference to the accompanying drawings in which.

DETAILED DESCRIPTION

Figure 1:
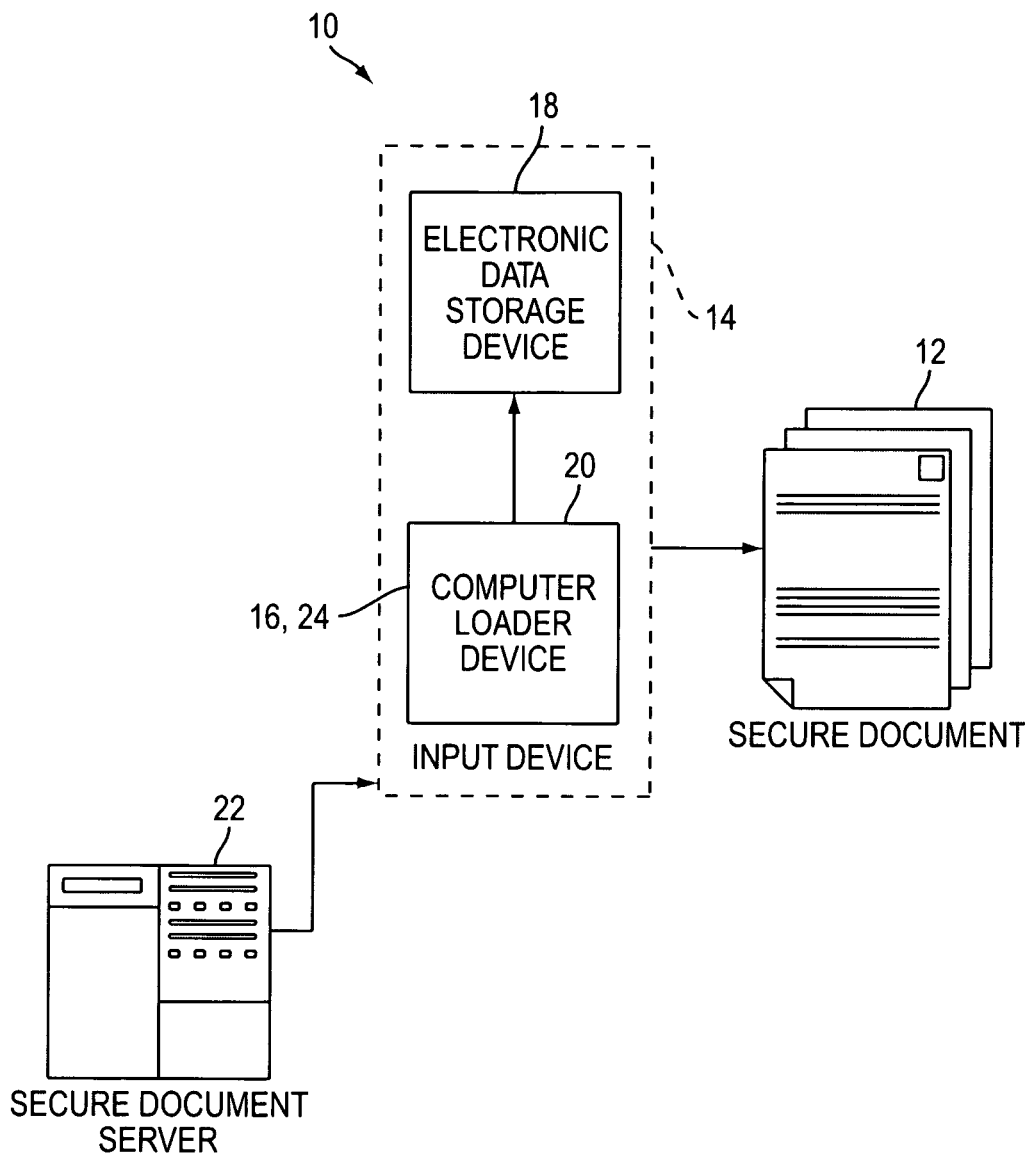
FIG. 1 is a schematic diagram showing the main components of a system for creating a secure document.

With reference to the drawings wherein like numerals represent like parts throughout the several figures, a system and method for preventing unauthorized copying of a secure document is disclosed. In the method for preventing unauthorized copying of a secure document, an electronic data storage device (EDSD) embedded in, or attached to the secure document, contains authorization information (AI) that must be entered into the copying device before the copying device is permitted to scan the secure document. "Authorization information" includes any digital feature that will allow the user to identify and authenticate himself including, but not limited to name, password, pin, X 509 certificate, access card, group belongings, time, date, location, decryption key, biometric technology or other identifiers.

"Document" as used herein refers to a member defining a surface for retaining human-readable information. While a document is typically at least one sheet of paper, the definition of document includes, but is not limited to, pages, sheets, labels, boxes, packages, tags, boards, signs and any other item which contains or includes a "writing surface" as defined herein below. "Writing surface" as used herein includes, but is not limited to, paper, cardboard, acetate, plastic, fabric, metal, wood and adhesive backed materials. Writing surfaces may be applied, for example, as pre-cut sheets or rolls.

An "electronic data storage device" is a machine-writeable and machine-readable device capable of storing electronic data. Electronic data storage device refers to a single electronic data storage device as well as to a collection of two or more electronic data storage devices connected, for example, in series, in parallel, or nested one within another. Examples of electronic data storage devices include, but are not limited to, radio frequency identification tags (RFID tags), proximity (Prox) tags, iButtons, smartcards, and similar devices. Radio frequency identification (RFID) is a method of remotely storing and retrieving data using devices called RFID tags/transponders. An RFID tag is a small object, such as an adhesive sticker, that can be attached to or incorporated into a product. RFID tags contain antennas to enable them to receive and respond to radio-frequency queries from an RFID transceiver.

The electronic data storage device may be attached to the member by an adhesive, by a spiral binding, by a removable adhesive, by a magnetic material, by an embedding procedure, by a glue, or some other mechanical attachment method known in the art. Attachment may be permanent or removable. "Attached" and "affixed" as used herein are defined as operatively connected to or in close proximity to. The electronic data storage device may be "embedded" to a writing surface of a document using a process such as Printed Organic Electronics (POE) using a reel-to-reel fabrication process to print the electronic data storage device on a writing surface. By attaching small, inexpensive, electronic data storage devices to paper documents that can store the required electronic information, the advantages of electronic media are merged with the convenience of paper.

The attachment of an electronic data storage device to a writing surface can be performed automatically at the same time that a document is printed or copied. This means that in every case that the hard-copy document is available, electronic information controlling the right to scan, print or copy that document is also available. Attaching an electronic data storage device containing authorization information that must be entered into a copying device to permit scanning the document transforms the document to a secure document, as defined herein.

With reference to FIG. 1, a system 10 for creating a secure document 12 includes a number of components which will be described in detail. An input device 14 receives or creates an electronic version of authorization information 16 that is to be stored in the electronic data storage device 18. Alternately, the authorization information 16 may come from another source, such as a master electronic data storage device containing one or more authorization codes/passwords. The input device 14 may include an integral computer loader device 20 for storing the authorization information 16 in the electronic data storage device 18. Alternatively, the input device 14 may transmit the authorization information to a separate computer loader device, which in turn stores the authorization information 16 in the electronic data storage device 18.

The input device 14 receives or creates an electronic version of information that is to be included in the secure document. Alternately, the information may come from another source, such as a separate document that exists in the memory of the input device 14 or a separate document that has been translated using the input device 14. Those skilled in the art will recognize that the information can come from various sources and be within the scope and spirit of the presently disclosed embodiments.

The input device 14 may include one or more of the following devices: a copier, a xerographic system, an electrostatographic machine, a digital image scanner (e.g., a flat bed scanner or a facsimile device), a disk reader having a digital representation of a document on removable media (CD, floppy disk, rigid disk, tape, or other storage medium) therein, a hard disk or other digital storage media having one or more document images recorded thereon, a network or other communication capability for receiving a document and/or related information, or a multi-functional device (MFD). The MFD may be an apparatus comprising a facsimile function, a printer function, a copy function, a scanner function, a phone answering function, or other similar functions. Alternately, a plurality of devices, including at least one of the above functions, may be operatively interconnected by cable or by radio waves to constitute a MFD. In an embodiment, the input device 14 is a MFD. Those skilled in the art will recognize that the system 10 could include any device suitable for printing or storing a digitized representation of a document. The input device 14 sends the document information 24 to a computer loader device that may be integrated in the input device 14, a freestanding device or a part of a document server 22.

Figure 2:
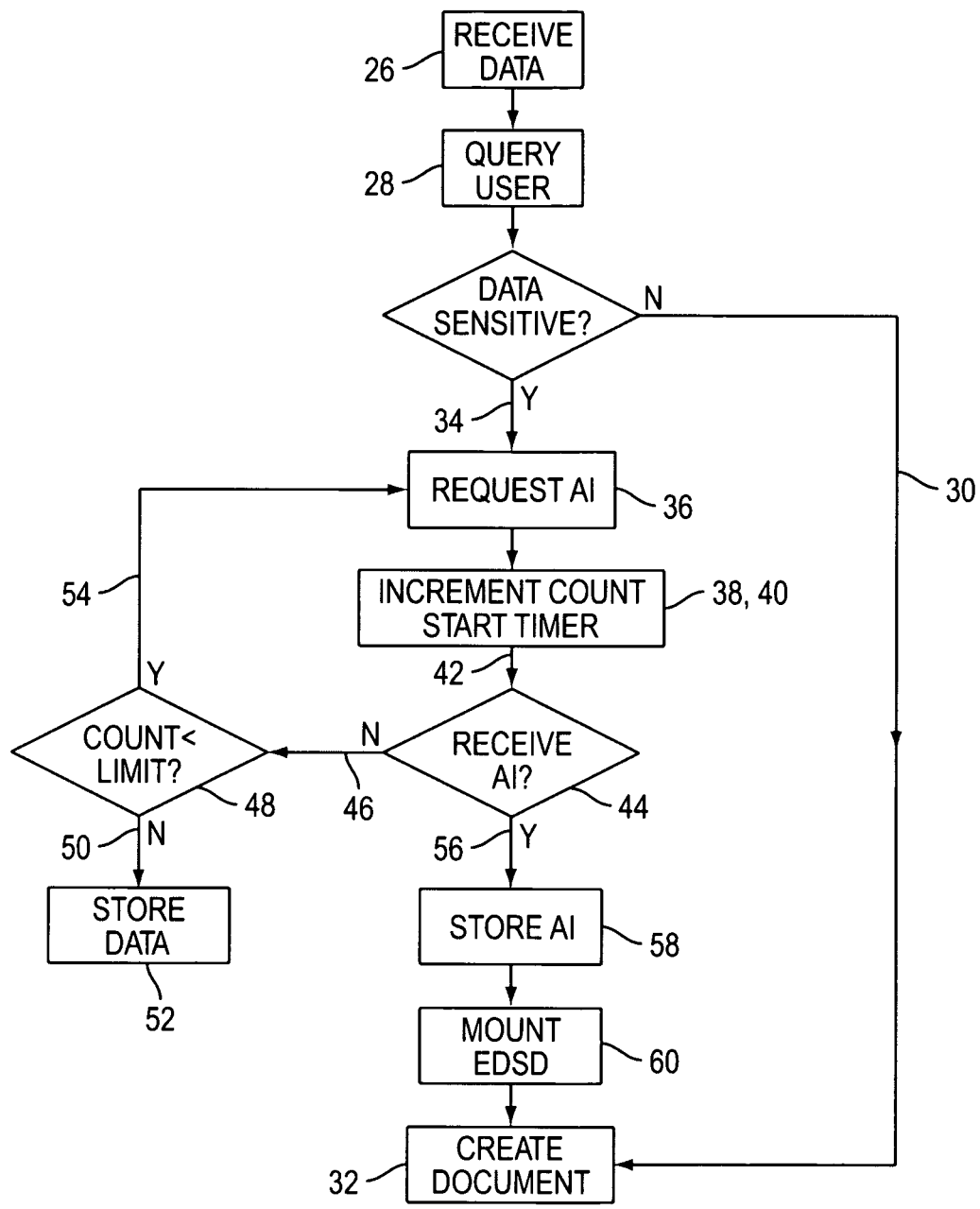
FIG. 2 is a flow diagram for the method of creating a secure document.

With reference to FIG. 2, in one embodiment the system 10 described above may also be used to create non-secure documents, that is documents that may be scanned or copied without restriction. Accordingly, when the computer loader device 20 receives 26 the document information the document server 22 queries 28 the user to input the security status of the document information 24. If the user designates the document information as non-secure 30, the document server 22 creates 32 the document, for example by transmitting the document information 24 to a printer. Non-secure documents 30 may or may not include an electronic data storage device 18. If the non-secure document 30 includes an electronic data storage device 18, the electronic data storage device 18 may either have no data stored therein or dummy authorization information.

If the user designates the document information as secure 34, the document server 22 then queries 36 the user to input the authorization information (AI), increments 38 a user query counter by one, and initiates 40 a query response timer. When the query response timer times-out 42, the document server 22 determines 44 whether the authorization information 16 has been received. If the authorization information 16 has not been received 46, the document server 22 determines 48 whether the user query count exceeds the count limit. If the user query count exceeds the count limit 50, the document information 24 is stored 52 and the document server 22 returns to standby. If the query count does not exceed the count limit 54, the document server 22 again queries 36 the user to input the authorization information, increments 38 the user query counter by one, and initiates 40 the query response timer. When the query response timer times-out 42, the document server 22 again determines 44 whether the authorization information 16 has been received. If the authorization information 16 has been received 56, the authorization information 16 is stored 58 in the electronic data storage device 18 (EDSD). The document server 22 then creates 32 the secure document, attaching 60 the electronic data storage device 18 thereto. The secure document 12 may be printed to form a hard-copy either using the input device or using a copier, printer or MFD.

Figure 3:
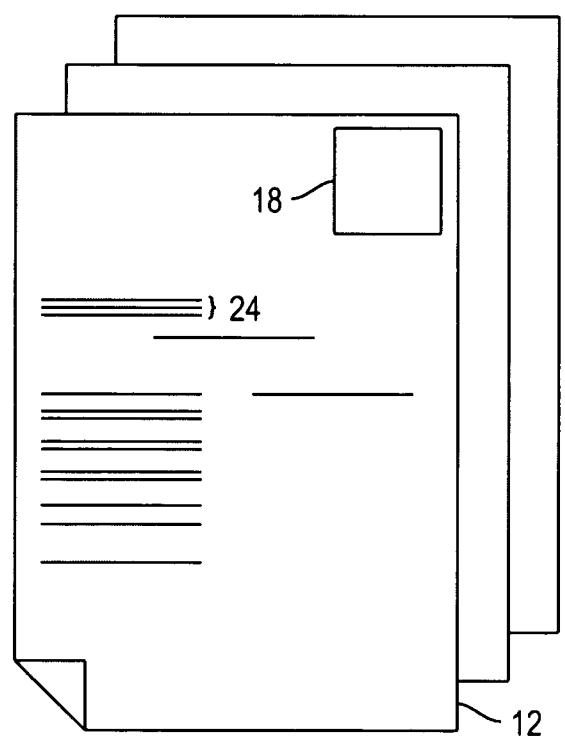
FIG. 3 is an exemplary illustration of a secure document created using the system of FIG. 1.

FIG. 3 is an exploded view of the secure document 12 created using the system 10 shown in FIG. 1. Those skilled in the art will recognize that the electronic data storage device 18 can be placed at any location within the secure document 12 and be within the scope and spirit of the invention. For example, the electronic data storage device 18 can be placed in the upper right-hand corner of the secure document 12 (as shown in FIG. 2), in any other corner of the secure document 12, in the margins of the secure document 12, on the backside of the secure document 12, or embedded into the writing surface on which the secure document 12 is printed.

Figure 4:
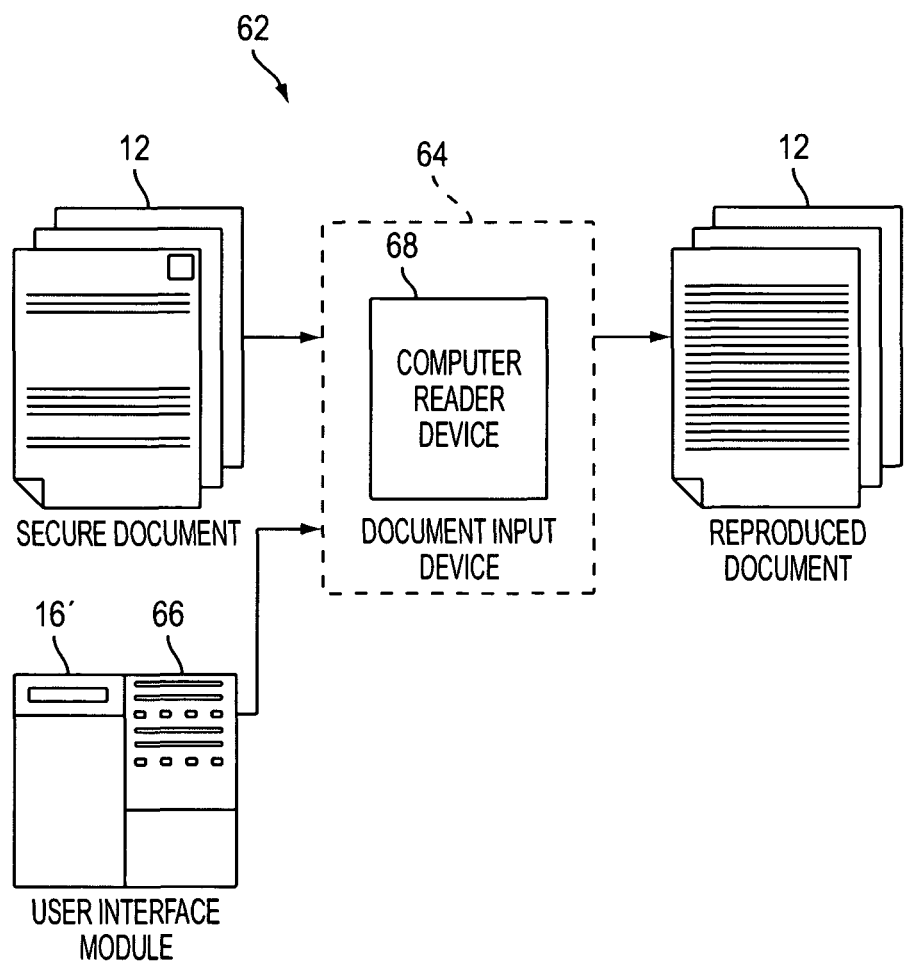
FIG. 4 is a schematic diagram showing the main components of a system for reproducing a secure document.
Figure 5:
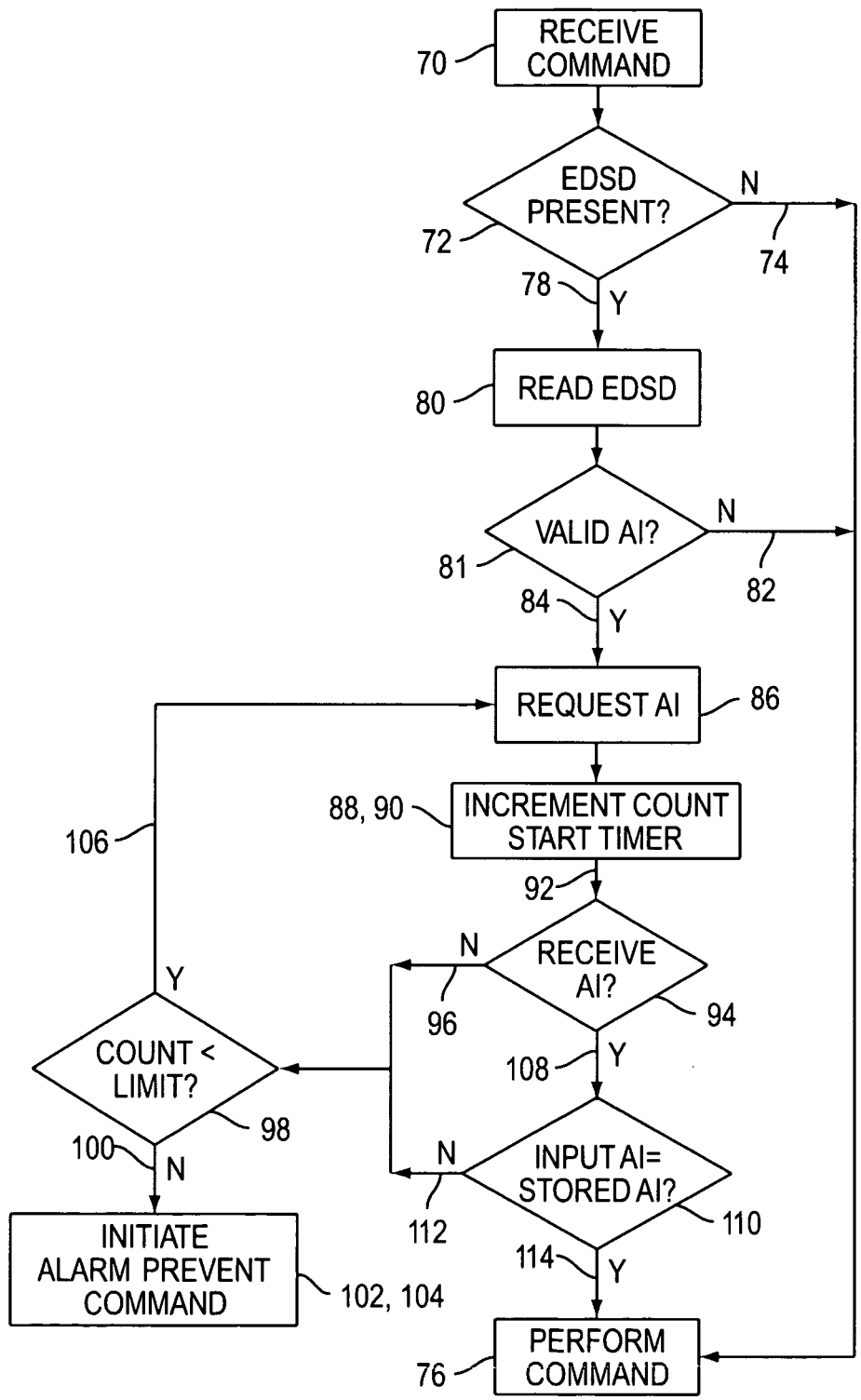
FIG. 5 is a flow diagram for the method of reproducing a secure document.

As shown in FIG. 4, a system 62 for reproducing the secure document 12 of FIG. 2 includes a document input device 64 which receives and digitizes the secure document 12. The document input device 64 may include one or more of the following devices: a copier, a xerographic system, an electrostatographic machine, a digital image scanner (e.g., a flat bed scanner or a facsimile device), a disk reader having a digital representation of a document on removable media (CD, floppy disk, rigid disk, tape, or other storage medium) therein, a hard disk or other digital storage media having one or more document images recorded thereon, a network or other communication capability for receiving a document and/or related information, or a multi-functional device (MFD). The MFD may be an apparatus comprising a facsimile function, a printer function, a copy function, a scanner function and an answering phone function. Alternately, a plurality of devices, each including at least one of the above functions, may be interconnected to constitute a MFD. In an embodiment the document input device 64 is a MFD. Those skilled in the art will recognize that the system 62 would work with any device suitable for printing or storing a digitized representation of a document.

A user interface module 66 is provided to gather authorization information 16' from a user wishing to copy the secure document 12. The user interface module 66 may be provided outside the document input device 64 or as part of the document input device 64. The user interface module 66 may include any feature that will allow the user to identify and authenticate himself including, but not limited to name, password, pin, X 509 certificate, access card, group belongings, time, date, location, decryption key, biometric technology or other identifiers. The user interface module 66 may comprise any personal identification system known to those skilled in the security arts. A computer reader device 68 is able to detect the presence of an electronic data storage device 18 and to read the data in the memory of the electronic data storage device 18.

To copy a document, the user places the document into an input tray of the document input device 64 and presses a copy button of a user interface module 66. When the document input device 64 receives 70 the copy command, the computer reader device 68 initiates a search 72 for an electronic data storage device (EDSD) 18 on the document. If no electronic data storage device is detected 74, the document input device 64 scans and reproduces 76 the non-secure document.

If an electronic data storage device 18 having authorization information (AI) is detected 78, the computer reader device reads 80 the electronic data storage device 18 and examines 81 the authorization information. If the authorization information is dummy authorization information 82, the document input device 64 scans and reproduces 76 the non-secure document. If valid authorization information 16 is detected 84, the user interface module 66 prompts 86 the user to input the authorization information, increments 88 a user query counter by one, and initiates 90 a query response timer. When the query response timer times-out 92, the document input device 64 determines 94 whether the authorization information 16' has been received. If the authorization information 16' has not been received 96, the document input device 64 determine 98 whether the user query count exceeds the count limit. If the user query count exceeds the count limit 100, the document input device 64 initiates an alarm 102 and prevents reproduction 104 of the secure document 12. If the query count does not exceed the count limit 106, the document input device 64 again queries 86 the user to input the authorization information, increments 88 the user query counter by one, and initiates 90 the query response timer. When the query response timer times-out 92, the document input device 64 again determines 94 whether the authorization information has been received.

If the authorization information 16' has been received 108, the authorization information 16' inputted by the user is compared 110 to the authorization information 16 retrieved from the electronic data storage device 18. If the authorization information 16' inputted by the user is not. identical 112 to the authorization information 16 retrieved from the electronic data storage device 18, the document input device 64 determines 98 whether the user query count exceeds the count limit. If the user query count exceeds the count limit 100, the document input device 64 initiates the alarm 102 and prevents reproduction 104 of the secure document 12. If the query count does not exceed the count limit 106, the document input device 64 again queries 86 the user to input the authorization information, increments 88 the user query counter by one, and initiates 90 the query response timer. When the query response timer times-out 92, the document input device 64 again determines 94 whether the authorization information 16' has been received. If the authorization information 16' has been received, the authorization information 16' inputted by the user is compared 110 to the authorization information 16 retrieved from the electronic data storage device 18. If the authorization information 16' inputted by the user is identical 114 to the authorization information 16 retrieved from the electronic data storage device 18, the document input device 64 scans and reproduces 76 the secure document 12.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. An apparatus preventing unauthorized copying of a secure document, the secure document including an electronic data storage device having authorization information stored therein, the apparatus comprising a secure document reproducing system including:
    a reader machine to detect the electronic data storage device and read the authorization information stored in the electronic data storage device;
    a user interface module to receive authorization information from a user; and
    a document input device to receive the secure document, compare the authorization information from the user to the authorization information read from the electronic data storage device of the secure document and produce the secure document based on the authorization information from the user being identical to the authorization information retrieved from the electronic data storage device of the secure document.

2. The apparatus of claim 1 wherein the document input device includes at least one of a copier, a xerographic system, an electrostatographic machine, a digital image scanner, a disk reader, a hard disk or other digital storage media, a network or other communication capability to receive a document or related information, or a multi-functional device.

3. The apparatus of claim 2 wherein the multi-functional device includes an apparatus comprising a facsimile function, a printer function, a copy function, and a scanner function, or a plurality of interconnected devices, each including at least one of a facsimile function, a printer function, a copy function, and a scanner function.

4. The apparatus of claim 1 wherein the user interface module is integral with the document input device.

5. The apparatus of claim 1 wherein the user interface module is remote from the document input device.

6. The apparatus of claim 1 wherein the user interface module includes at least one of apparatus to input a name, apparatus to input a password, apparatus to input a pin, apparatus to input a X 509 certificate, apparatus to input an access card, apparatus to input a time, apparatus to input a date, apparatus to input a location, apparatus to input a decryption key, apparatus to input a biometric technology identifier, or apparatus to input other identifiers.

7. The apparatus of claim 1 further comprising a secure document creating system including:
    a document producing device to produce a secure document having an electronic data storage device affixed thereto;
    an input device to receive or create the electronic authorization information; and
    a computer loader device to store the electronic authorization information in the electronic data storage device.

8. The apparatus of claim 7 wherein the document producing device includes at least one of a copier, a xerographic system, an electrostatographic machine, a digital image scanner, a disk reader, a hard disk or other digital storage media, a network or other communication capability to receive a document or related information, or a multi-functional device.

9. The apparatus of claim 8 wherein the multi-functional device includes an apparatus comprising a facsimile function, a printer function, a copy function, and a scanner function, or a plurality of interconnected devices, each including at least one of a facsimile function, a printer function, a copy function, and a scanner function.

10. A method of reproducing a secure document at a secure document reproducing system, the secure document including an electronic data storage device having authorization information stored therein, the method comprising:
    reading the authorization information stored in the electronic data storage device affixed to the document, at the secure document reproducing system;
    inputting, by an input machine, user authorization information into the secure document reproducing system;
    comparing the authorization information input into the secure document reproducing system to the authorization information stored in the electronic data storage device of the secure document; and
    reproducing the secure document based on the authorization information input into the secure document reproducing system being identical to the authorization information stored in the electronic data storage device of the secure document.

11. The method of claim 10 wherein reproducing an authorized copy of the secure document also includes:
    initiating a search for an electronic data storage device with a computer reader device of the secure document reproducing system;
    reading the electronic data storage device with the computer reader device based on an electronic data storage device being detected; and
    determining whether the electronic data storage device contains authorization information that is not dummy authorization information.

12. The method of claim 11 wherein reproducing an authorized copy of the secure document further includes reproducing the document based on no electronic data storage device being detected or based on the electronic data storage device not containing authorization information that is not dummy authorization information.

13. The method of claim 11 wherein reproducing an authorized copy of the secure document also includes prompting the user to input the authorization information based on authorization information that is not dummy authorization information being detected.

14. The method of claim 13 wherein the user authorization information also includes:
incrementing a user query counter by one;
initiating a query response timer;
determining whether the user authorization information has been received when the query response timer times-out; and
comparing the user authorization information inputted into the secure document reproducing system to the authorization information stored in the electronic data storage device based on the authorization information being received.

15. The method of claim 14 wherein the user authorization information further includes:
determining whether the user query count exceeds a count limit, based on the user authorization information inputted into the secure document reproducing system being not identical to the authorization information stored in the electronic data storage device; and
preventing reproduction of the secure document based on the user query count exceeding the count limit; or
re-inputting the user authorization information based on the query count does not exceeding the count limit.

16. The method of claim 14 wherein the user authorization information further includes:
determining whether the user query count exceeds a count limit based on the user authorization information not being received; and
preventing reproduction of the secure document based on the user query count exceeding the count limit; or
re-inputting the user authorization information based on the query count not exceeding the count limit.

17. A secure document reproducing system preventing unauthorized copying of a secure document, the secure document including an electronic data storage device having authorization information stored therein, the system comprising:
a printing device,
a reader machine to detect the electronic data storage device and read the authorization information stored in the electronic data storage device, and
a user interface module to receive authorization information from a user;
wherein the secure document reproducing system compares the authorization information from the user to the authorization information stored in the electronic data storage device of the secure document and initiates the printing device to reproduce the secure document based on the authorization information from the user being identical to the authorization information read from the electronic data storage device of the secure document.

18. The secure document reproducing system of claim 17 wherein the user interface module includes at least one of apparatus to input a name, apparatus to input a password, apparatus to input a pin, apparatus to input a X 509 certificate, apparatus to input an access card, apparatus to input a group belongings, apparatus to input a time, apparatus to input a date, apparatus to input a location, apparatus to input a decryption key, apparatus to input a biometric technology identifier, or apparatus to input other identifiers.

19. A secure document reproducing system preventing unauthorized copying of a secure document, the secure document including a machine-writeable and machine-readable device having authorization information stored therein, the system comprising:
a printing device,
a reader machine to detect the machine-writeable and machine-readable device and read the authorization information stored in the machine-writeable and machine-readable device, and
a user interface module to receive authorization information from a user;
a document input device to receive the secure document, compare the authorization information from the user to the authorization information stored in the machine-writeable and machine-readable device of the secure document and initiate the printing device to reproduce the secure document based on the authorization information from the user being identical to the authorization information retrieved from the machine-writeable and machine-readable device of the secure document.

20. The secure document reproducing system of claim 19 wherein the machine-writeable and machine-readable device includes an RF transmitter and the reader machine includes an RF receiver.

21. The secure document reproducing system of claim 19 wherein the machine-writeable and machine-readable device is an RFID and the reader machine is an RFID reader device.

* * * * *